No. 727,387. Patented May 5, 1903.

UNITED STATES PATENT OFFICE.

EMIL KRAUS, OF BASLE, SWITZERLAND, ASSIGNOR TO SOCIETY OF CHEMICAL INDUSTRY IN BASLE, OF BASLE, SWITZERLAND.

BLUE SULFUR DYE AND PROCESS OF MAKING SAME.

SPECIFICATION forming part of Letters Patent No. 727,387, dated May 5, 1903.

Application filed March 7, 1903. Serial No. 146,740. (No specimens.)

*To all whom it may concern:*

Be it known that I, EMIL KRAUS, chemist, a subject of the Emperor of Austria-Hungary, and a resident of Basle, Switzerland, have invented new and useful Improvements in the Manufacture of Blue Sulfur Dyestuffs, of which the following is a full, clear, and exact specification.

The alphylparaämidoparaoxydialphylamido compounds, as alphylparaämidoparaoxydiphenylamin and its derivatives and homologues, as well as the indophenols corresponding to these leucoindophenols have not yet been utilized to produce sulfur dyestuffs. This depends probably on the fact that these bodies have been only difficultly and seldom quite entirely accessible according to the methods usually employed for the manufacture of indophenols. Now I have found that these compounds, which constitute very valuable parent materials for the production of blue sulfur dyes, may be produced in a simple way and in a good output by the condensation of paranitrosophenols with alphylated aromatic amins—as, for instance, the diphenylamin, the methyldiphenylamin, &c., in strong sulfuric acid and by reduction of the obtained condensation products with a reducing agent—such as, for example, sodium sulfid or zinc powder. The new dyestuffs obtained by heating these alphylparaämidoparaoxydialphylamido compounds with polysulfids distinguish themselves by a beautiful indigo tint, great affinity for cotton fibers, and eminent fastness to milling.

The process of producing the alphylparaämidoparaoxydialphylamido compounds used as parent material may be illustrated by the following example:

In a vesssl provided with an agitator fifty-one kilograms of diphenylamin are dissolved in about five hundred kilograms of sulfuric acid of seventy-five per cent. The solution is cooled down to about 20° centigrade and gradually mixed with thirty-eight kilograms of nitrosophenol, slowly poured in, so that the temperature does not rise higher than about 25° centigrade. The condensation takes place nearly instantly, the emulsion at first of a certain thickness turning over to an intense blue thin liquor. After agitation during about five hours the mass is poured on ice, whereby the coloring-matter separates itself in insoluble crystalline state. This coloring-matter is then separated by filtration and the exceeding acid removed by washing with water.

For the reduction the paste is stirred up with water, then mixed with fifty kilograms of soda-lye of thirty per cent. and fifty kilograms of crystallized sodium sulfid, and agitated in cold state during two hours. The solution, at first dark blue, becomes light brown. An addition of one hundred kilograms of hydrochloric acid precipitates the leuco-indophenol in form of a gray precipitate, which is then filtered, pressed, and dried.

The phenylparaämidoparaoxydiphenylamin obtained according to the above-described process is very difficultly soluble in hot water, but moderately soluble in hot diluted mineral acids, easily soluble in caustic alkalies, and may eventually be purified by means of the chlorhydrate. The alkaline solutions get on the air rapidly a blue color under formation of indophenol. In alcohol the compound is easily soluble and may be obtained from this dissolving agent or from an aqueous alcoholic solution in form of laminæ, melting at 141° centigrade. The direct condensation product is insoluble in dilute mineral acids, but easily soluble in caustic alkalies with blue color. Addition of reducing-agents produces the decoloration of the solution.

In the foregoing example the ordinary nitrosophenol used may be replaced by another nitrosophenol, such as the nitrosocresol, the nitrosoxylenol. On the other hand, instead of diphenylamin, its homologues—such as phenyltolylamin, &c., and its derivatives, as methyldiphenylamin, &c.—may be employed.

To transform the phenylparaämidoparaoxydiphenylamin produced according to the described process into a blue sulfur dyestuff, I proceed in the following manner: Fifty-five kilograms of phenylparaämidoparaoxydiphenylamin or the equivalent quantity of the corresponding indophenol or of the direct condensation product obtained as described in the foregoing example are poured into a solution of thirty-five kilograms of sodium tetrasulfid in three hundred liters of alcohol, at first heated during several hours to 80° to 90° centigrade in an autoclave provided with a stirrer, whereupon the temperature is raised during about six hours up to 135° to 140° centigrade, and; finally, still a short time up to 150° to 160° centigrade. After cooling down the brown solution is freed by filtration from small quantities of insoluble products, the alcohol distilled off, and the residue dried eventually at a temperature not higher than about 160° centigrade. By dissolving this residue or the alcoholic raw melt in water and blowing air in the solution or adding acid to the same the coloring-matter is separated, which is then isolated by filtration, and, if necessary, further purified. It represents in dry state a blue powder which dissolves easily in water on addition of sodium sulfid and from this solution dyes unmordanted cotton directly of a pretty indigo tint. The tints are fast to acids, light, and milling.

By varying the reaction conditions the tint of the resulting dyestuff may be varied somewhat. At a higher temperature and when using more sodium tetrasulfid or more sulfur more green, but with less sodium tetrasulfid more red tints are obtained. Moreover, the results depend also from the duration of the reaction. The sulfurization may also be carried out without alcohol in aqueous suspension with polysulfids alone with or without addition of a diluting agent—such as, for instance, glycerin—or of metallic salts.

What I claim is—

1. The described process for producing blue sulfur dyestuffs, by condensing nitrosophenols with alphylated aromatic amido compounds, treating the resulting condensation products with reducing agents and treating the so-obtained alphylparaämidoparaoxydialphylamido compounds with polysulfids.

2. The described process for producing condensation products by condensing nitrosoindophenols with alphylated aromatic amido compounds.

3. The described process for producing alphylparaämidoparaoxydialphylamido compounds by condensing nitrosophenols with alphylated aromatic amido compounds and treating the so-obtained condensation products with reducing agents.

4. The described process for producing blue sulfur dyestuffs by treating alphylparaämidoparaoxydialphylamido compounds with polysulfids.

5. As a new article of manufacture the described blue coloring-matter resulting from the reaction of polysulfids on phenylparaämidoparaoxydiphenylamin, the said coloring-matter being, in dry state, a blue powder, easily soluble in water in the presence of an alkali sulfid and dyeing unmordanted cotton in a bath containing an alkali sulfid indigo-blue shades fast to acids, milling and light.

In witness whereof I have hereunto signed my name, this 24th day of February, 1903, in the presence of two subscribing witnesses.

EMIL KRAUS.

Witnesses:
GEO. GIFFORD,
ALBERT VICTOR GROETE.